United States Patent
Haarer et al.

(10) Patent No.: US 7,258,135 B2
(45) Date of Patent: Aug. 21, 2007

(54) PRESSURE REGULATOR FOR A FUEL SUPPLY SYSTEM OF AN INTERNAL COMBUSTION ENGINE

(75) Inventors: Werner Haarer, Illingen (DE); Hans-Joerg Fees, Bietigheim-Bissingen (DE); Andreas Peetz, Ludwigsburg (DE); Ralph Ittlinger, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 10/495,770

(22) PCT Filed: Dec. 6, 2002

(86) PCT No.: PCT/DE02/04478

§ 371 (c)(1),
(2), (4) Date: May 17, 2004

(87) PCT Pub. No.: WO03/102408

PCT Pub. Date: Dec. 11, 2003

(65) Prior Publication Data

US 2005/0005973 A1 Jan. 13, 2005

(30) Foreign Application Priority Data

Jun. 4, 2002 (DE) .................. 102 24 682

(51) Int. Cl.
*F16K 15/04* (2006.01)
*G05D 16/02* (2006.01)
*F02M 69/54* (2006.01)

(52) U.S. Cl. ................... 137/539; 137/535; 251/337
(58) Field of Classification Search ............ 137/535, 137/539, 539.5; 123/506, 510; 251/337
See application file for complete search history.

(56) References Cited

U.S. PATENT DOCUMENTS

| | | | | |
|---|---|---|---|---|
| 675,990 | A * | 6/1901 | Way .................. | 137/539 |
| 1,900,385 | A * | 3/1933 | Kahr .................. | 137/539 |
| 1,922,379 | A * | 8/1933 | Longfellow .......... | 137/539 |
| 3,768,102 | A * | 10/1973 | Kwan-Gett et al. .. | 137/539 |
| 4,387,715 | A * | 6/1983 | Hakim et al. ........ | 604/9 |
| 5,190,362 | A * | 3/1993 | Schaefer et al. ..... | 137/539.5 |
| 5,220,941 | A | 6/1993 | Tuckey | |
| 5,251,664 | A * | 10/1993 | Arvidsson et al. .... | 137/539.5 |
| 5,655,503 | A * | 8/1997 | Kampichler et al. .. | 123/510 |
| 5,775,894 | A * | 7/1998 | Kosco, Jr. ........... | 137/539 |
| 6,681,798 | B2 * | 1/2004 | Bueser et al. ........ | 137/539 |
| 6,802,791 | B1 * | 10/2004 | Yoshioka ............. | 137/539 |
| 6,983,762 | B2 * | 1/2006 | Wheeler et al. ...... | 137/539 |

FOREIGN PATENT DOCUMENTS

| | | |
|---|---|---|
| DE | 101 07 223 A1 | 8/2002 |
| EP | 0 694 691 A1 | 1/1996 |

* cited by examiner

*Primary Examiner*—John Rivell
(74) *Attorney, Agent, or Firm*—Ronald E. Greigg

(57) ABSTRACT

A pressure regulator for a fuel supply system of an internal combustion engine for regulating a fuel pressure, including a valve, having a valve ball forced against a valve seat into the closing position by the action of a valve leaf spring. With the valve open, at least some of the fuel flow that flows around the valve ball is deflected against an impact face coupled with the valve leaf spring for generating a flow force oriented counter to the closing force of the valve leaf spring. As a result, the pressure regulating performance of the pressure regulator is improved.

15 Claims, 3 Drawing Sheets

PRESSURE REGULATOR FOR A FUEL SUPPLY SYSTEM OF AN INTERNAL COMBUSTION ENGINE

CROSS-REFERENCE TO RELATED APPLICATIONS

This application is a 35 USC 371 application of PCT/DE 02/04478 filed on Dec. 6, 2002.

BACKGROUND OF THE INVENTION

1. Field of the Invention

The invention is directed to an improved pressure regulator for a fuel supply system of an internal combustion engine for regulating a fuel pressure, including a valve which includes a valve ball that is forced against a valve seat into the closing position by the action of a valve leaf spring.

2. Description of the Prior Art

One pressure regulator of the type with which this invention is concerned is described by German Patent Disclosure DE 101 07 223A1, in which the valve leaf spring is pivotably supported, and one arm of the valve leaf spring toward the valve seat with respect to the pivotable support is braced on the valve ball, while one arm of the valve leaf spring located on the side opposite the valve seat is braced on a support body, in such a way that torque equilibrium prevails at the valve leaf spring. The prestressing force generated by the support body is transmitted by the valve leaf spring to the valve ball in the form of closing force. If fuel pressure that is high enough to generate a greater pressure force than the closing force acting on the valve ball prevails at the pressure input, then the valve ball lifts from the valve seat and opens a defined flow cross section, so that fuel can flow to the pressure outlet. SUMMARY AND ADVANTAGES OF THE INVENTION Without the impact face according to the present invention, the force exerted by the valve leaf spring on the valve ball of the known regulator increases steadily as the flow becomes greater and consequently the valve ball stroke lengthens. Since an equilibrium of force or moment ensues at the valve leaf spring, the result is that with an increasing flow, the fuel pressure likewise increases, in a way that is unwanted for a pressure regulator.

As a result of the definitive characteristics of the invention a comparatively lesser increase in the characteristic pressure and flow curve of the pressure regulator is obtained; therefore even if the flow quantity increases, the set pressure becomes only slightly greater. When the valve ball has lifted from the valve seat, the deflection according to the invention of the fuel flow to the impact face creates a flow force that acts on the valve leaf spring counter to the closing force of the valve leaf spring and that is greater, the greater the flow through the valve of the pressure regulator. Thus with a greater flow and a consequent longer stroke of the valve ball, on the one hand the force exerted by the elastic valve leaf spring on the valve ball in the closing direction increases, but on the other hand, the contrary flow force on the valve leaf spring also increases, so that these forces at least partly compensate for one another. As a result, the influence of the stroke of the valve leaf spring and thus the influence of the flow on the pressure are advantageously less.

In a preferred embodiment, the impact face is formed by a portion of a lower face of the valve leaf spring, which portion is adjacent to a contact point of the valve ball with the valve leaf spring. This is especially advantageous in terms of production costs, since because of the integration of the impact face with the valve leaf spring, no additional components are necessary.

In order to deflect the fuel flow, flowing around the valve ball, onto the impact face at the valve leaf spring, the valve seat preferably has a cone angle in a range between 40° and 110°, preferably 60°.

In a further embodiment, the impact face is formed by a face that is defined at the valve ball and extends radially outward into the fuel flow. As a result, the fuel flow flowing around the valve ball can strike the impact face nearly perpendicularly, and this is an ideal state in terms of the flow force generated as a result.

In an especially preferred embodiment, the valve leaf spring is provided with at least one opening, which increases in cross section in a direction pointing away from a leaf spring bearing point. As a result, if the valve leaf spring bends, a substantially constant tension ensues over the length, and the spring constant of the valve leaf spring becomes relatively low; changes in the stroke of the valve ball therefore have a lesser effect on the pressure. In the preferred embodiment, in which the impact face is located on the valve leaf spring, the opening is located outside the impact face, in order not to hinder the buildup of the flow force.

A refinement provides that the valve leaf spring is embodied as rectangular and the opening is embodied as essentially triangular. The valve leaf spring is preferably supported tiltably at a pivot shaft, and one arm of the valve leaf spring is tensed against a prestressing spring for generating a force by which the other arm of the valve leaf spring holds the valve ball down in the valve seat. Then, both arms of the valve leaf spring are provided with at least one triangular opening, since they both contribute to the overall bending strength of the valve leaf spring.

BRIEF DESCRIPTION OF THE DRAWINGS

Exemplary embodiments of the invention are shown in the drawing and described in further detail, herein below, with reference to the drawings. in which.

DESCRIPTION OF THE PREFERRED EMBODIMENTS

Figure 1:
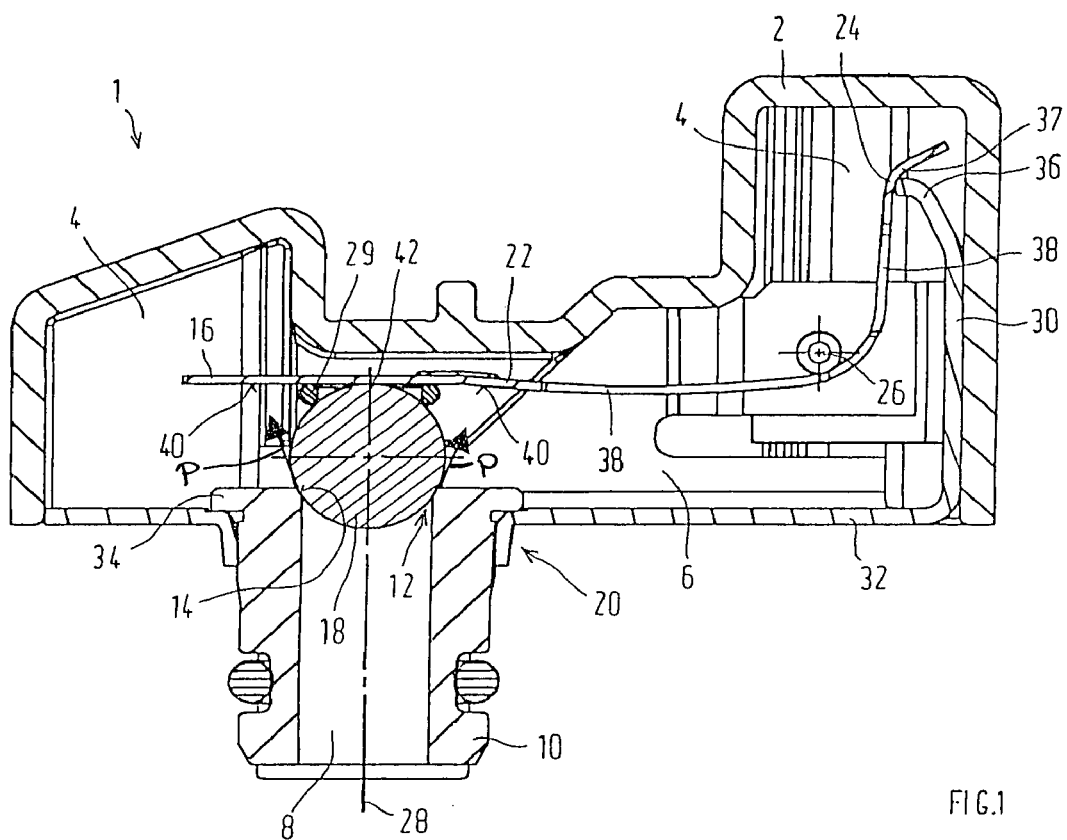
FIG. 1 shows a cross-sectional view of a preferred embodiment of a pressure regulator in accordance with the invention.

The pressure regulator of the invention is designated generally by reference numeral 1 and is shown there in FIG. 1 in a closing position. In use, the regulator is secured to a tank fitting unit or filter unit, not shown for reasons of scale, that is disposed in a fuel tank of a motor vehicle, and serves to regulate the fuel pressure in the fuel system of a self-igniting internal combustion engine. The pressure regulator 1 has a housing 2, and in each of two upward-drawn housing necks there is a respective lateral opening which connects an interior 6 of the housing 2 to the fuel tank. Protruding into the housing 2 at the bottom is a connection piece 10 that forms a pressure inlet 8; it is connected to a pressure line, not shown, of the fuel system, and fuel flowing back from a fuel distributor flows through it.

On the end of the connection piece 10, there is a valve seat 12 with a conical face 14 for centering a valve ball 18. Instead of being embodied directly on the connection piece 10, the valve seat 12 can also be embodied on the housing 2; in this case, the housing 2 and the valve seat 12 are embodied for instance as a one-piece cast part machined in metal-cutting fashion. The cone angle of the conical face 14 is in a range between 40° and 110° and is preferably 60°. The conical face 14 has a length of essentially 0.5 mm. Because of the action of a valve leaf spring 16, the valve ball 18 is urged against the valve seat 12, and the valve ball 18 touches the conical face 14 along a line. The valve leaf spring 16, valve ball 18 and valve seat 12 together form an overflow valve 20 of the pressure regulator 1. The valve ball 18 may be of steel, ceramic, or plastic; its diameter is in a range between 3 mm and 12 mm and is preferably 7 mm. mm.

The valve leaf spring 16 preferably has an angular form, comprising two arms 22, 24 extending essentially at right angles to one another, and is pivotable about an a pivot shaft 26, which is supported in the housing 2 and preferably formed by a pin extending transverse to the length of the valve leaf spring 16 and perpendicular to a plane that contains the center axis 28 of the valve seat 12. The shaft 26 furthermore extends in the region of an imaginary abutting line of the two arms 22, 24 of the valve leaf spring 16. The total length of the coiled valve leaf spring is from 10 to 40 mm, for instance, and its width is approximately 5 mm to 20 mm. The spacing of the center axis 28 of the valve seat 12 from the articulated shaft 26 is preferably 8 mm to 35 mm.

Between the arm 22 of the valve leaf spring 16 toward the valve seat, which preferably extends perpendicular to the center axis 28 of the valve seat, and the valve ball 18 that with its apex contacts the valve leaf spring 16, there is a damping ring 29, which for instance has a circular cross section and comprises an elastomer. More precisely, the valve ball 18, with one spherical segment of its hemisphere pointing toward the valve leaf spring 16, protrudes into an annular opening in the damping ring 29 and thereby retains this ring on the valve leaf spring 16. The diameter of the annular opening and the valve ball 18 are preferably selected such that a slight freedom of motion, in the form of a narrow gap, is still present between the valve leaf spring 16 and the damping ring 29. In operation, frictional forces develop between the damping ring 29, valve leaf spring 16 and valve ball 18, and these forces are on the one hand great enough to damp vibrational motions of the valve ball 18, but on the other are not so great that centering of the valve ball 18 in the valve seat 12 when the overflow valve 20 closes is hindered.

A prestressing force engages the arm 24 of the valve leaf spring located on the side opposite the valve seat 12 with respect to the shaft 26, and at the arm 22 toward the valve seat this force generates a force that urges the valve ball 18 against the valve seat 12. This prestressing force is preferably formed by a tensing leaf spring 30, which extends essentially parallel to the arm 24 of the valve leaf spring 16 located on the side opposite the valve seat 12. The tensing leaf spring 30 is preferably embodied in one piece with a cap 32 that closes the housing 2 of the pressure regulator 1 at the bottom and that is engaged from behind, in the assembled state, by a radially outer annular shoulder 34 of the connection piece 10 and protrudes away from the connection piece at a right angle. The free end 36 of the tensing leaf spring 30 is bent toward the arm 24 of the valve leaf spring 16 located on the end portion opposite the valve seat 12 and engages a rounded recess 37, embodied on this arm, in such a way that a prestressing force generated by the tensing leaf spring 30 is introduced essentially perpendicularly into the arm 24 of the valve leaf spring 16. The tensing leaf spring 30, with its curved end 36, exerts a torque on the pivotably supported valve leaf spring 16, by which torque the valve ball 18 is urged against the valve seat 12. The magnitude of the closing force that is operative on the head end in reaction to the prestressing force of the tensing leaf spring 30 on the valve ball 18 is the result of the selected lever ratios of the two arms 22, 24. In that case, a torque equilibrium then prevails at the valve leaf spring 16.

Figure 3:
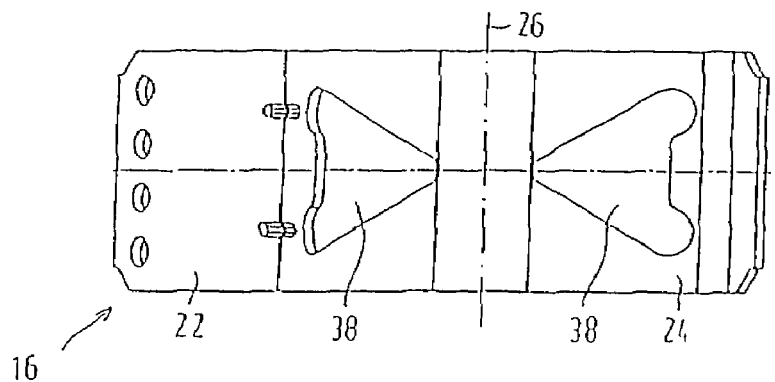
FIG. 3 shows a perspective view of a valve leaf spring of the pressure regulator of FIG. 1 or FIG. 2.

As seen from FIG. 3, in which the valve leaf spring 16 is shown by itself, its two arms 22, 24 are each provided with a respective opening 38, which increases in cross section in a direction pointing away from the shaft 26. Preferably, both openings 38 are embodied essentially triangularly and are stamped out from the valve leaf spring 16.

In the context of the above description, the mode of operation of the pressure regulator 1 is as follows: When fuel pressure that is high enough to generate a greater pressure force than the closing force acting on the valve ball 18 prevails at the pressure inlet 8, the valve ball 18 lifts from the valve seat 12 and opens a defined flow cross section, so that fuel can flow into the interior 6 of the housing 2 and from there to the pressure outlets 4. Because of the elastic properties of the valve leaf spring 16, the flow cross section increases as the fuel volume increases.

In this process, the fuel flows around the valve ball 18, approximately as indicated by the arrows P in FIG. 1, and because of the above-described embodiment of the conical face 14 of the valve seat 12, the streamlines are deflected onto an impact face 40, which is disposed approximately annularly around the valve leaf spring adjacent to a contact point 42 of the valve ball 18 and the valve leaf spring 16 and is formed by part of the lower face of the arm 22 toward the valve seat of the valve leaf spring 16. The impact face 40 is an annular face, with the contact point 42 as its center point, and the internal diameter of the annular face, as is usual for a ring, has some spacing from the center point. The oncoming flow of the fuel against the impact face 40 generates a flow force, acting counter to the closing force of the valve leaf spring 16, that is greater, the greater the flow through the overflow valve 20 of the pressure regulator 1, and its effect on the pressure difference between the pressure inlet 8 and the pressure outlets 4 has been described above. In order not to hinder the buildup of the flow force, the opening 38 in the arm 22 toward the valve ball 18 is located in a region between the impact face 40 and the articulated shaft 26.

Figure 2:
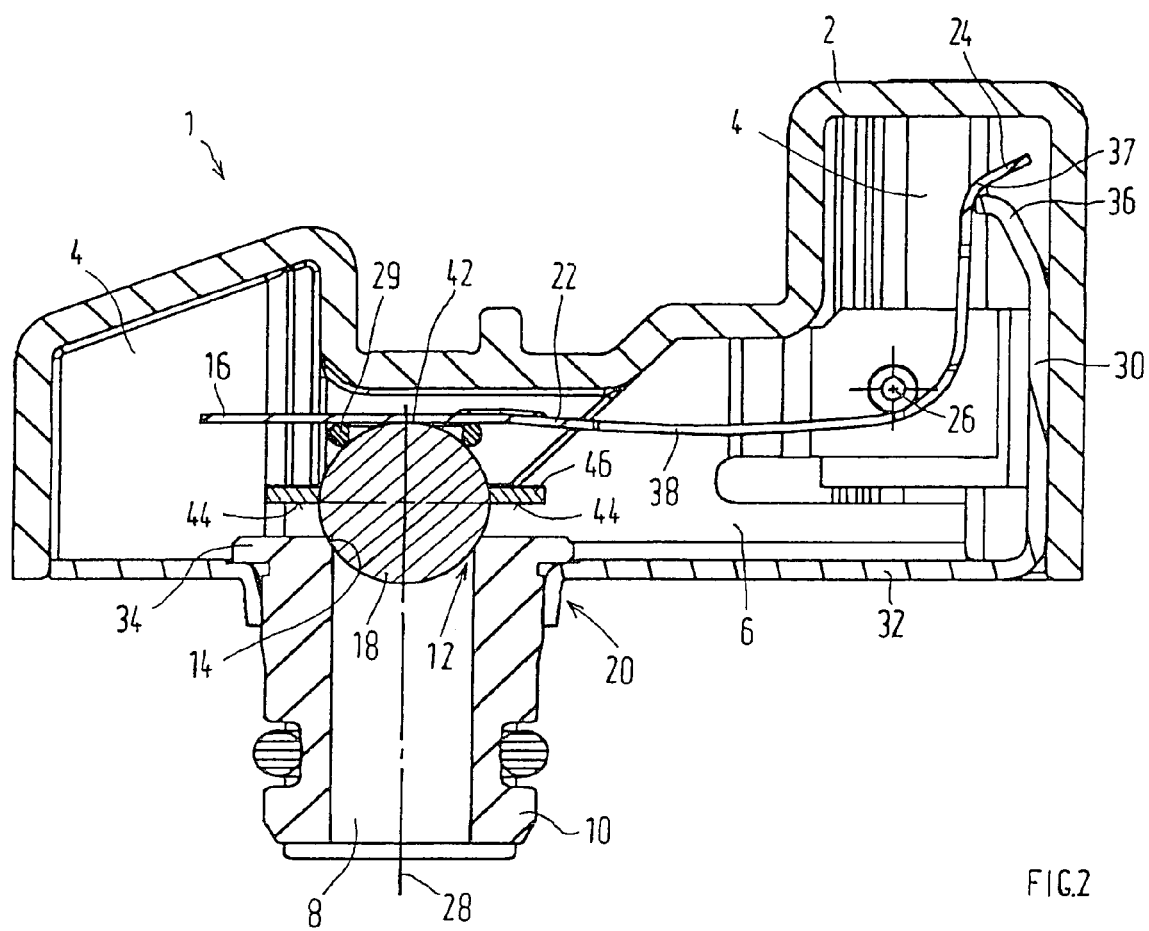
FIG. 2 shows a cross-sectional view of a further embodiment of a pressure regulator in accordance with the invention.

In the further exemplary embodiment of the invention shown in FIG. 2, those elements that remain the same and function the same as in the previous example are identified by the same reference numerals. In a distinction from the previous example, the impact face 44 is embodied not on the valve leaf spring 16 itself but rather on the valve ball 18. The impact face 44 for the fuel flowing around the valve ball 18 is embodied here by a face 44 that is defined on the valve ball 18 and extends radially outward into the fuel flow and forms the lower annular face of a ring 46 surrounding the valve ball 18, preferably along its equator line. The flow force acting on the ring 46 is then transmitted to the valve leaf spring 16 via the valve ball 18.

Figure 4:
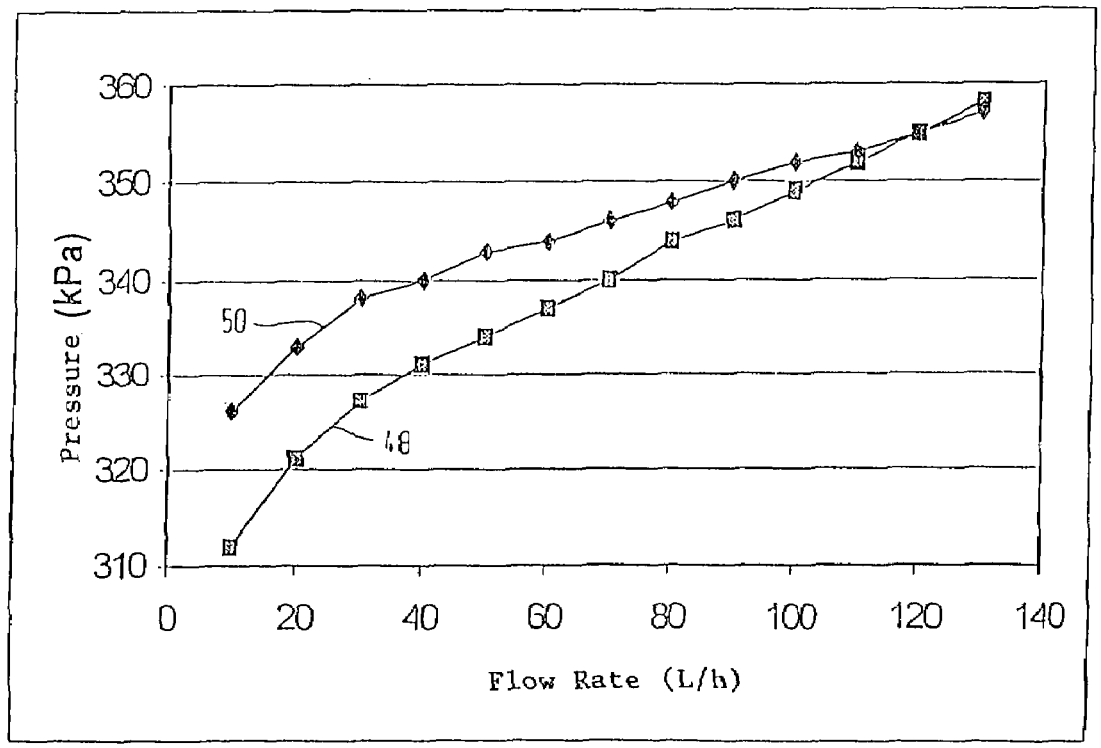
FIG. 4 shows a characteristic pressure and flow curve of a pressure regulator of FIG. 1 or FIG. 2.

The effect of the invention is shown in the pressure-flow graph in FIG. 4, in which the pressure course 48 of a pressure regulator without the impact face 40, 44 of the invention is represented by rectangular marking points, and the pressure course 50 of the pressure regulator 1 of the invention with the impact face 40, 44 is represented by diamond-shaped marking points. As the graph shows, the slope of the characteristic curve 50 of the pressure regulator 1 with the impact face 40, 44 is less than that of the characteristic curve 48 of a pressure regulator without an impact face. In addition, the pressure level for the characteristic curve 50 of the pressure regulator 1 with the impact face 40, 44 is already relatively high at low flow rates and is thus closer to the corresponding pressure values at higher flow rates than is the case for the characteristic curve 48 of the pressure regulator without the impact face, in which the slope at low flow rate values is relatively great. Consequently, the pressure changes in the pressure regulator 1 of the invention, especially at low flow quantities, are substantially less than in a pressure regulator without an impact face.

The foregoing relates to preferred exemplary embodiments of the invention, it being understood that other variants and embodiments thereof are possible within the spirit and scope of the invention, the latter being defined by the appended claims.

The invention claimed is:

1. A pressure regulator for a fuel supply system of an internal combustion engine for regulating a fuel pressure, comprising
    a valve including a valve ball forced against a valve seat into the closing position by the action of a valve leaf spring,
    an impact face (40; 44) coupled with the valve leaf spring (16) and in a position whereby with the valve (20) open, at least some of the fuel flow flowing around the valve ball (18) is deflected against the impact face (40; 44) when the valve is open for generating a flow force oriented counter to the closing force of the valve leaf spring (16), wherein the valve leaf spring (16) is provided with at least one opening (38), which increases in cross section in a direction pointing away from a leaf spring bearing point (26).

2. The pressure regulator in accordance with claim 1, wherein the impact face is formed by a portion (40) of one face of the valve leaf spring (16), which portion is adjacent to a contact point (42) of the valve ball (18) with the valve leaf spring (16).

3. The pressure regulator in accordance with claim 2, wherein the valve seat (12) has a cone angle in a range between 40° and 110°.

4. The pressure regulator in accordance with claim 3, wherein the cone angle is about 60°.

5. The pressure regulator in accordance with claim 1, wherein the impact face comprises a face (44) that is defined at the valve ball (18) and extending radially outward into the fuel flow.

6. The pressure regulator in accordance with claim 5, wherein the impact face (44) is disposed annularly all the way around along the equator line of the valve ball (18) and protrudes perpendicularly away from this line.

7. The pressure regulator in accordance with claim 1, wherein the valve ball (18) contacts the valve seat (12) essentially with linear contact.

8. The pressure regulator in accordance with claim 5, wherein the valve ball (18) contacts the valve seat (12) essentially with linear contact.

9. The pressure regulator in accordance with claim 1, wherein the opening (38) is located outside the impact face (40).

10. The pressure regulator in accordance with claim 9, wherein the valve leaf spring (16) is embodied as rectangular, and wherein the opening (38) is embodied as essentially triangular.

11. The pressure regulator in accordance with claim 10, wherein the valve leaf spring (16) is supported tiltably at a pivot shaft (26), and wherein one arm (24) of the valve leaf spring (16) is tensed against a prestressing spring (30) for generating a force by which the other arm (22) of the valve leaf spring (16) holds the valve ball (10) down in the valve seat (12).

12. The pressure regulator in accordance with claim 11, wherein both arms (22, 24) of the valve leaf spring (16) are provided with at least one triangular opening (38).

13. A pressure regulator for a fuel supply system of an internal combustion engine for regulating a fuel pressure, comprising
    a valve including a valve ball forced against a valve seat into the closing position by the action of a valve leaf spring,
    an impact face (40) coupled with the valve leaf spring (16) and in a position whereby with the valve (20) open, at least some of the fuel flow flowing around the valve ball (18) is deflected against the impact face (40) when the valve is open for generating a flow force oriented counter to the closing force of the valve leaf spring (16),
    the valve leaf spring (16) has one side, oriented toward the valve ball (18), with a contact point (42) that contacts the valve ball (18),
    the side of the valve leaf spring (16) oriented toward the valve ball (18) has a width, in the region of the contact point (42) viewed transversely to the longitudinal direction of the valve leaf spring (16), that is greater than the diameter of the valve ball (18),
    wherein the impact face (40) is provided on the side of the valve leaf spring (16) oriented toward the valve ball (18),
    and wherein the impact face (40) on the valve leaf spring (16) is embodied annularly around the contact point (42),
    wherein the impact face comprises a face (44) that is defined at the valve ball (18) and extending radially outward into the fuel flow, and
    wherein the valve leaf spring (16) is provided with at least one opening (38), which increases in cross section in a direction pointing away from a leaf spring bearing point (26).

14. The pressure regulator in accordance with claim 13, wherein the opening (38) is located outside the impact face (40).

15. The pressure regulator in accordance with claim 14, wherein the valve leaf spring (16) is embodied as rectangular, and wherein the opening (38) is embodied as essentially triangular.

* * * * *